(12) United States Patent
Briggs et al.

(10) Patent No.: US 10,698,368 B2
(45) Date of Patent: *Jun. 30, 2020

(54) APPARATUS AND PROCESS FOR DISPENSING A MEASURED QUANTITY OF LIQUID PRODUCT

(71) Applicant: The Procter & Gamble Company, Cincinnati, OH (US)

(72) Inventors: Nicole Lynn Briggs, West Chester, OH (US); Scott Eugene Mizer, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/122,947

(22) Filed: Sep. 6, 2018

(65) Prior Publication Data

US 2019/0071299 A1    Mar. 7, 2019

Related U.S. Application Data

(60) Provisional application No. 62/554,756, filed on Sep. 6, 2017.

(51) Int. Cl.
*G04F 1/08* (2006.01)
*G01F 13/00* (2006.01)

(52) U.S. Cl.
CPC ............... *G04F 1/08* (2013.01); *G01F 13/006* (2013.01)

(58) Field of Classification Search
CPC ................................. G01F 13/006; G04F 1/08
USPC ................... 222/638, 639, 651, 652, 23, 51
See application file for complete search history.

(56) References Cited

U.S. PATENT DOCUMENTS

| | | | |
|---|---|---|---|
| 68,532 A | 9/1867 | Rooney | |
| 2,099,629 A | 11/1937 | Schaetzel | |
| 3,920,149 A | 11/1975 | Fortino | |
| 4,054,026 A | 10/1977 | Goodrich | |
| 4,090,356 A * | 5/1978 | Arnold | G04F 1/08 368/93 |
| 4,228,649 A * | 10/1980 | Weiss | G04F 1/08 368/93 |
| 4,353,489 A | 10/1982 | Arnold | |
| 4,550,862 A | 11/1985 | Barker | |

(Continued)

FOREIGN PATENT DOCUMENTS

| | | |
|---|---|---|
| WO | WO2015097606 A3 | 10/2015 |
| WO | WO2018145645 A1 | 8/2018 |
| WO | WO2018147946 A1 | 8/2018 |

OTHER PUBLICATIONS

Homemade Water Clock, https://web.archive.org/web/20160522013315/https://teachbesideme.com/homade-water-clock/ May 22, 2016 ,13 pages.

(Continued)

*Primary Examiner* — Nicholas J. Weiss
(74) *Attorney, Agent, or Firm* — Gary J. Foose

(57) ABSTRACT

An apparatus and process for dispensing a measured quantity of liquid product from a container. The apparatus includes a pour chamber and a density timer. The density timer is engaged with the pour chamber. The density timer includes a reservoir containing a timing liquid and a timing element. The timing element is visible from outside the reservoir. One or more dosing indicia are on or adjacent the reservoir.

19 Claims, 8 Drawing Sheets

(56) References Cited

U.S. PATENT DOCUMENTS

| | | | |
|---|---|---|---|
| 4,666,065 A | 5/1987 | Ohren | |
| 4,741,459 A | 5/1988 | Silvenis | |
| 4,836,415 A | 6/1989 | Grussmark | |
| 5,031,804 A | 7/1991 | Conrad | |
| 5,058,772 A | 10/1991 | Moore | |
| 5,255,819 A * | 10/1993 | Peckels | B67D 3/0041 |
| | | | 222/1 |
| 5,457,665 A | 10/1995 | Reid | |
| 5,462,202 A | 10/1995 | Haffner | |
| 5,505,349 A | 4/1996 | Peckels | |
| 5,566,862 A | 10/1996 | Haffner | |
| 5,850,953 A * | 12/1998 | Dallas, Jr. | B65D 47/06 |
| | | | 222/571 |
| 5,855,299 A | 1/1999 | Arnold | |
| 5,941,422 A | 8/1999 | Struble | |
| 6,036,055 A | 3/2000 | Mogadam | |
| 6,409,046 B1 * | 6/2002 | Peckels | B67D 3/0041 |
| | | | 222/1 |
| 6,926,179 B2 | 8/2005 | Wagner, III | |
| 7,306,121 B2 | 12/2007 | Ophardt | |
| 7,845,524 B2 | 12/2010 | Evans | |
| 9,428,374 B2 | 8/2016 | Houck | |
| 9,717,373 B2 | 8/2017 | Andrews | |
| 9,718,665 B2 | 8/2017 | Wittrup | |
| 2005/0103803 A1 | 5/2005 | Hung | |
| 2006/0091152 A1 | 5/2006 | Evans | |
| 2006/0091153 A1 | 5/2006 | Evans | |
| 2006/0131330 A1 | 6/2006 | Stebick | |
| 2007/0194047 A1 | 8/2007 | Tauber | |
| 2009/0045224 A1 | 2/2009 | Faaborg | |
| 2010/0116776 A1 | 5/2010 | Szekely | |
| 2010/0213211 A1 | 8/2010 | Dinger | |
| 2011/0297698 A1 | 12/2011 | Chiang | |
| 2013/0008919 A1 | 1/2013 | Honan | |
| 2013/0334246 A1 | 12/2013 | Houck | |
| 2014/0252034 A1 | 9/2014 | Brannon | |
| 2015/0298875 A1 | 10/2015 | Dagnelie | |
| 2017/0073115 A1 | 3/2017 | Crawford | |
| 2018/0310778 A1 | 11/2018 | Smith | |
| 2020/0025599 A1 * | 1/2020 | Koster | B65D 51/2807 |

OTHER PUBLICATIONS

Non-Final Office Action for U.S. Appl. No. 16/011,240, dated Dec. 28, 2018, 14 pages.

Non-Final Office Action for U.S. Appl. No. 16/011,259, dated Dec. 28, 2018, 14 pages.

Notice of Allowance for U.S. Appl. No. 15/962,032, dated Mar. 18, 2019, 8 pages.

PCT International Search Report for International Application Serial No. PCT/US2018/049637, dated Dec. 13, 2018, 11 pages.

Notice of Allowance for U.S. Appl. No. 16/011,240, dated May 9, 2019.

Notice of Allowance for U.S. Appl. No. 16/011,259, dated May 9, 2019.

* cited by examiner

APPARATUS AND PROCESS FOR DISPENSING A MEASURED QUANTITY OF LIQUID PRODUCT

FIELD OF THE INVENTION

Liquid product dispensing by timed pouring.

BACKGROUND OF THE INVENTION

Many liquid products are dispensed from containers through an open end of the container or through a dispensing system that forms part of the closure for a container. For instance, liquid laundry products are commonly packaged in a container having a spout fitment fitted thereto and a closure that engages with the spout fitment and or container. The closure often has a secondary purpose to function as a measuring cup and is provided with dosing indicia on the interior or exterior of the closure, the indicia having the form of lines or bars marked on the interior wall of the closure that correspond with particular volumes of liquid product that are desirable to use depending on the size of the load of laundry or other washing conditions.

Sometimes it can take some effort for the consumer to precisely dispense the desired amount of liquid laundry product into the dosing cup. If the consumer under-doses the liquid laundry product, he or she may be dissatisfied with the performance of the liquid laundry product because he or she failed to use an effective amount of the product. If the consumer overdoses the liquid laundry product, the consumer may be dissatisfied with the number of loads of laundry he or she can do with a single container of liquid laundry product.

There are a variety of devices that have a purpose of measuring the quantity of liquid product dispensed from a container as the container dispenses the liquid. Measuring the quantity of liquid product dispensed when pouring a liquid from a container is an exceptionally challenging task because the flow rate from container may not be constant, air entering the container to replace the liquid product dispensed may result in irregular liquid flow from the container, and the dynamics of liquid product flow through constrictions and multiple pathways out of the container is complicated.

With these limitations in mind, there is a continued unaddressed need for apparatuses and process for dispensing a measured quantity of liquid product.

SUMMARY OF THE INVENTION

An apparatus comprising: a pour chamber comprising an inlet end and an outlet end and a pour chamber wall extending from said inlet end to said outlet end, wherein said pour chamber has an open cross sectional area through which flow can occur from said inlet end to said outlet end, wherein said open cross sectional area is a function of position between said inlet end and said outlet end, said outlet end being downstream of said inlet end, wherein said outlet end has an outlet perimeter, and wherein a portion of said pour chamber upstream of said outlet end is a spout having a spout entrance upstream of said outlet end; a dam engaged with said pour chamber wall and positioned between said inlet end and said spout, wherein said open cross sectional area is reduced where said dam is positioned as compared to a position immediately upstream of said dam, and wherein said dam partially obstructs said spout entrance; a vent comprising an entrance spaced apart from said outlet end and a vent wall extending from said entrance to an exit, wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter and said outlet perimeter is more than about 2 times greater than said exit perimeter; and a density timer engaged with said pour chamber, said density timer comprising: a reservoir containing a timing liquid (405) having a first density and a timing element having a second density, wherein said second density differs from said first density, said timing element is movable through said timing liquid, and said timing element is visible from outside said reservoir; and one or more dosing indicia on or adjacent to said reservoir.

An apparatus comprising: a pour chamber comprising an inlet end and an outlet end and a pour chamber wall extending from said inlet end to said outlet end, wherein said pour chamber has an open cross sectional area through which flow can occur from said inlet end to said outlet end; and a density timer engaged with said pour chamber, said density timer comprising: a reservoir containing a timing liquid having a first density and a timing element having a second density, wherein said second density differs from said first density, said timing element is movable through said timing liquid, and said timing element is visible from outside said reservoir; and one or more dosing indicia on or adjacent to said reservoir.

An apparatus comprising: a pour chamber comprising an inlet end and an outlet end and a pour chamber wall extending from said inlet end to said outlet end, wherein said pour chamber has an open cross sectional area parallel to said outlet end; a dam engaged with said pour chamber wall and positioned between said inlet end and said outlet end, wherein said dam is nearer to said outlet end than said inlet end, wherein said dam blocks more than about 30% of said open cross sectional area of said pour chamber where said dam is positioned, and wherein said outlet end has an outlet perimeter; a vent comprising an entrance exterior to said outlet end and a vent wall extending from said entrance to an exit, wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter and said outlet perimeter is more than about 2 times greater than said exit perimeter; and a density timer engaged with said pour chamber, said density timer comprising: a reservoir containing a timing liquid having a first density and a timing element having a second density, wherein said second density differs from said first density, said timing element is movable through said timing liquid, and said timing element is visible from outside said reservoir; and one or more dosing indicia on or adjacent to said reservoir.

DETAILED DESCRIPTION OF THE INVENTION

Figure 1:
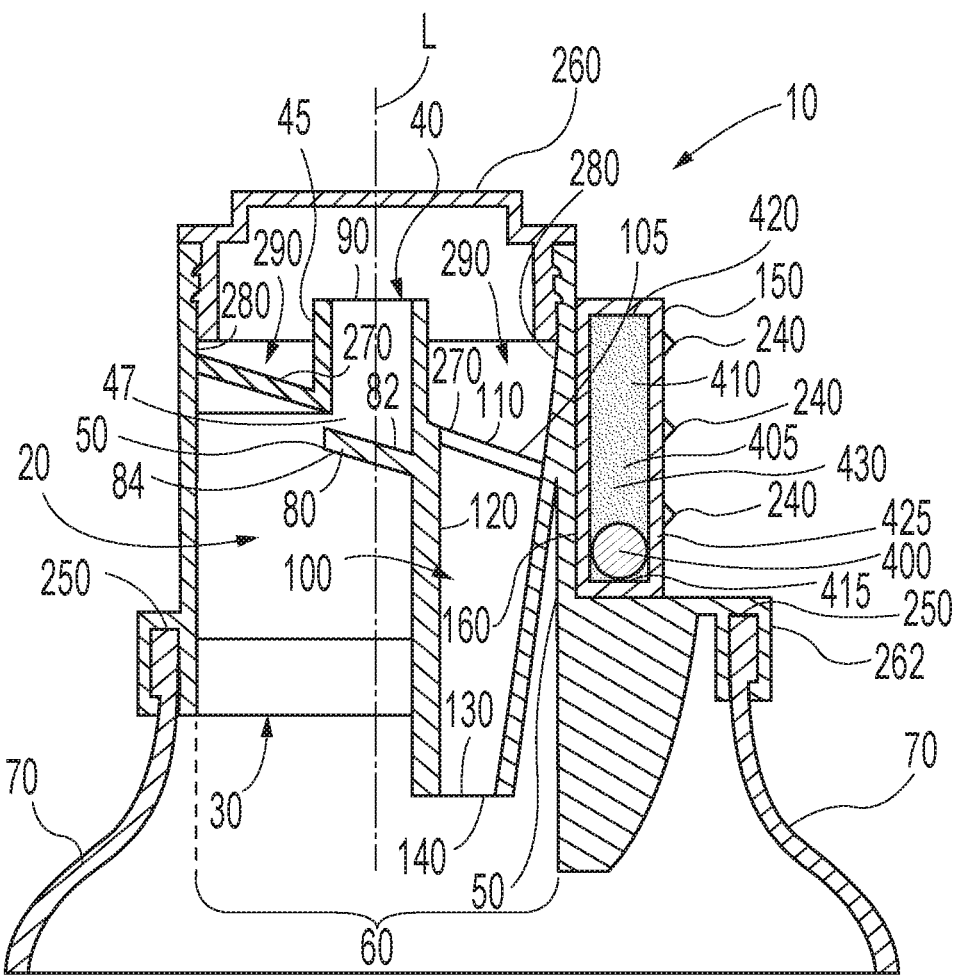
FIG. 1 is a cross section of an apparatus.

FIG. 1 is an apparatus 10 comprising a pour chamber 20. The pour chamber 20 comprises an inlet end 30, an outlet end 40, and pour chamber wall 50 extending from the inlet end 30 to the outlet end 40. The pour chamber 20 has an open cross sectional area 60. The open cross sectional area 60 can be taken at various planes parallel to the inlet end 30. For a spout in which a longitudinal axis L passing through the open end 30 of the spout 45 also passes through the inlet end 30, the longitudinal axis L can be orthogonal to the inlet end 30.

The pour chamber 20 is the location through which liquid product from the container 70 passes on its way past the dam 80 and through the outlet end 40. In use, the aforesaid elements may form part of a closure system for a container 70. As the user tips the container 70 to dispense liquid product from the container 70, the liquid product may flow from the container through the inlet end 30, then downstream through the pour chamber 20, then further downstream through the outlet end 40 to be dispensed, for example to a bucket, washing machine, compartment of a washing machine, or the like. The liquid product can be a liquid laundry product. The liquid product can be selected from the group consisting of liquid laundry detergent, liquid fabric softener, liquid scent enhancer, and liquid fabric restorer.

The inlet end 30 can have an open cross sectional area 60 from about 3 $cm^2$ to about 40 $cm^2$, optionally from about 5 $cm^2$ to about 20 $mm^2$. The outlet end 40 can have an open cross sectional area 60 from about 0.25 $cm^2$ to about 8 $cm^2$. The open cross sectional area 60 of the inlet end 30 can be larger than the open cross sectional area 60 of the outlet end 40. The open cross sectional area 60 is measured in planes through which flow can occur and can vary as a function of position from the inlet end 30 to the outlet end 40. That is, open portions that are along dead end paths are not measured. Only the portion or portions through which flow can be active are considered. The pour chamber 20 can be generally tapered. The pour chamber 20 can be tapered or constricted from the inlet end 30 to the outlet end 40. The pour chamber 20 can be generally conically shaped. The inlet end 30 can have an open cross sectional area 60 that is greater than the open cross sectional area 60 of the outlet end 40. It is possible that constriction from the inlet end 30 to the outlet end 40 can help concentrate flow of the liquid product and provide an oversupply of liquid product from the container towards the outlet end 40 so that the flow rate out of the outlet end 40 is reasonably or substantially steady since the flow rate may be constrained by one or more of the limiting flow rate of the pour chamber 20, the limiting flow rate of the outlet end 40, the limiting flow rate of the spout 45, or limiting flow rate past the dam 80. Within the pour chamber 20, there may be features such as a vent 100 that passes through the pour chamber 20, the dam 80, and other appurtenances such as the structure to connect the apparatus 10 to a container 70, for example threads or a bead designed to be snap-fit to the open end 250 of a container 70.

The outlet end 40 can have a diameter of from about 3 mm to about 30 mm, optionally about 5 mm to about 20 mm, further optionally about 5 mm to about 15 mm, optionally about 10 mm. The smaller the diameter or open cross sectional area of the outlet end 40 the slower the flowrate of liquid product will be for a given liquid product. The outlet end 40 can have an open cross sectional area of from about 7 $mm^2$ to about 700 $mm^2$, optionally about 20 $mm^2$ to about 700 $mm^2$, optionally about 20 $mm^2$ to about 300 $mm^2$, optionally about 75 $mm^2$.

A portion of the pour chamber 20 upstream of the outlet end 40 can be a spout 45. The spout 45 can have a spout entrance 47 upstream of the outlet end 40. A spout 45 can be a narrowed portion of the pour chamber 20 provided to focus flow of liquid product over a small area when the liquid product exits the outlet end 40. The aforesaid ranges of diameter and open cross sectional area for the outlet end 40 can be suitable for the outlet end 40 of the spout 45. The outlet end 40 can have a diameter of from about 3 mm to about 30 mm, optionally about 5 mm to about 20 mm, further optionally about 5 mm to about 15 mm, optionally about 10 mm. The smaller the diameter or open cross sectional area of the outlet end 40 the slower the flowrate of liquid product will be for a given liquid product. The outlet end 40 can have an open cross sectional area of from about 7 $mm^2$ to about 700 $mm^2$, optionally about 20 $mm^2$ to about 700 $mm^2$, optionally about 20 $mm^2$ to about 300 $mm^2$, optionally about 75 $mm^2$.

A portion of the pour chamber 20 upstream of the outlet end 40 can be a spout 45. The spout 45 can have a spout entrance 47 upstream of the outlet end 40. A spout 45 can be a narrowed portion of the pour chamber 20 provided to focus flow of liquid product over a small area when the liquid product exits the outlet end 40. The aforesaid ranges of diameter and open cross sectional area for the outlet end 40 can be suitable for the outlet end 40 of the spout 45.

The apparatus 10 can comprise a dam 80 engaged with the pour chamber wall 50. The dam 80 can be a structure that blocks flow of liquid product from edge to edge of the flow path when the apparatus 10 is in a position to dispense liquid product, by way of nonlimiting example as in FIG. 1. That is much like a dam extending between the banks of a river, except in the context of pouring, flow over the dam, or even full flow in the space between the edge of the dam 80 and the interior of the pour chamber 20 above the dam, may be desired. Optionally, the dam 80 can be a structure that resists flow of liquid product, forcing liquid product to flow around the dam 80 before reaching the spout entrance 47, by way of nonlimiting example as shown in FIG. 1. For instance, the dam 80 can be an obstruction in the pathway of flow of the liquid product. That is, liquid product may flow over the top of and or around the sides of the dam 80. The dam 80 can be positioned so that it is in line with the spout entrance 47. The dam 80 can be positioned to be in line with the centerline of the spout entrance. The dam 80 can be positioned so that it locally diverts at or near the spout entrance 47 stream lines of liquid product flow from the inlet end 30 to the spout entrance 47. The dam 80 can act to divert streamlines of liquid product flow from the inlet end to the outlet end, and in particular divert or lengthen streamlines of liquid product flow at or near the entrance to the spout entrance 47.

The dam 80 can be positioned between the inlet end 30 and the outlet end 40. In this position, the dam 80 partially obstructs the spout entrance 47. For example, as shown in FIG. 1, which is a nonlimiting example, the dam 80 can be just upstream of the spout entrance 47. In that position, the dam 80 is considered to partially obstruct the spout entrance 47. Liquid product dispensed from the container 70 passes from the container 70, through the inlet end 30, into the pour chamber 20, over, around, or past the dam 80, into the spout entrance 47, and through the outlet end 40. The dam 80 is in the interior of the pour chamber 20. The dam 80 can help to reduce the influence of the total head upstream of the dam on the flow rate of the liquid product past the dam 80 and can have a comparatively large or even greater effect on flow rate out of the outlet end 40 than the shape of the pour chamber 20, the surface roughness of the pour chamber 20, and total head above the dam 80 when the apparatus 10 is in a position in which liquid product is dispensed from the apparatus 10.

The dam 80 reduces the open cross sectional area 60 where the dam 80 is positioned as compared to a position immediately upstream of the dam 80. The dam 80 can be positioned at the spout entrance 47, immediately upstream of the spout entrance 47, or upstream of the spout entrance 47. The dam 80 can positioned nearer to the spout entrance 47 than to the inlet end 30. The dam 80 can positioned so that it has an effect or even large effect, or even a significant effect on the flow of liquid product into the spout 45. That is, the dam 80 can have a comparatively larger effect on flow of the liquid product into the spout 45 than other features within or defining the pour chamber 20 that are upstream of the dam 80. A function of the dam 80 is to provide for a structural feature that has a substantial impact on the flow rate of liquid product out of the outlet end 40, which can serve reduce the impact of total head of the liquid product above the inlet end 30 or dam 80 on flow rate of the liquid product out of the outlet end 40.

The dam 80 can reduce the open cross sectional area by more than about 10%, optionally more than about 20%, further optionally more than about 30%, where the dam is positioned as compared to a position immediately upstream of the dam 80. In use, flow through the pour chamber 20 is from upstream to downstream, which is from the inlet end 30, past the dam 80, and out the outlet end 40. Just upstream of the dam 80, there may be a relatively large open cross sectional area and at the dam 80 the open cross sectional area can be reduced abruptly. For instance, just upstream of the dam 80 the open cross sectional area can be from about 1000 mm² to about 10000 mm², optionally from about 2000 mm² to about 7000 mm², optionally about 3000 mm² to about 5000 mm², optionally about 4000 mm².

The dam 80 can be positioned nearer to the outlet end 40 than the inlet end 30. This is thought to provide for continual collection in the pour chamber 20 of a sufficient quantity of liquid product to provide nearly a constant flow rate of liquid product past the dam 80 towards the outlet end 40. The dam 80 can block more than about 10% of the open cross sectional area 60 of the pour chamber 20 at the location where the dam 80 is positioned. The dam 80 can block more than about 20% of the open cross sectional area 60 of the pour chamber 20 at the location where the dam 80 is positioned. The dam 80 can block more than about 30% of the open cross sectional area 60 of the pour chamber 20 at the location where the dam 80 is positioned. The dam 80 can block more than about 40% of the open cross sectional area 60 of the pour chamber 20 at the location where the dam 80 is positioned. The dam 80 can block more than about 50% of the open cross sectional area 60 of the pour chamber 20 at the location where the dam 80 is positioned. The dam 80 can block more than about 60% of the open cross sectional area 60 of the pour chamber 20 at the location where the dam 80 is positioned. The more the dam 80 blocks flow, the more likely it is that a sufficient volume of liquid product will be behind the dam 80 to support steady flow over the dam 80 and the slower the liquid product will flow out the outlet end 40.

The dam 80 can have a dam face area that is more than about 20% of the open cross section area 60 of the outlet end 40. The dam face area is measured as the projected area of the dam 80 presented upstream towards the inlet end 30. The dam face area can be from about 50 mm² to about 200 mm², optionally about 80 mm² to about 160 mm², optionally about 100 mm² to about 140 mm², optionally about 120 mm². The dam 80 can have a dam face area that is more than about 30% of the open cross section area 60 of the outlet end 40. The dam 80 can have a dam face area that is more than about 40% of the open cross section area 60 of the outlet end 40. The dam 80 can have a dam face area that is more than about 50% of the open cross section area 60 of the outlet end 40. The dam 80 can have a dam face area that is more than about 70% of the open cross section area 60 of the outlet end 40. The dam 80 can have a dam face area that is more than about 90% of the open cross section area 60 of the outlet end 40. The dam 80 can be located from about 1 mm to about 40 mm, or optionally 10 mm to about 30 mm, or optionally about 15 mm to about 25 mm from the outlet end 40, or optionally about 20 mm from the outlet end 40, or optionally from about 1 mm to about 6 mm, or optionally about 1 mm to 4 mm from the outlet end 40.

The dam 80 can have a downstream face 82 oriented downstream towards the outlet end 40 and an opposing upstream face 84 oriented upstream towards the inlet end 30. The dam 80 can divert stream lines of liquid product flow from the inlet end 30 to outlet end 40. That is, streamlines of liquid product flow from the inlet end 30 to the outlet end 40 can be nonlinear.

At least a portion of the dam 80 can intersect a straight longitudinal axis L passing through the outlet end 40 and orthogonal to the inlet end 30. Arranged as such, when a user looks down through the outlet end 40, at least a portion of the dam 80 can obstruct the view of the inlet end 30. The spout 45 can be a straight spout through which a straight longitudinal axis L can pass without intersecting the spout 45. Optionally, the spout 45 can be curved such that a straight longitudinal axis L cannot pass through the spout 45 without intersecting an interior wall of the spout 45.

The outlet end 40 has an outlet perimeter 90. The outlet perimeter 90 is the interior perimeter of the pour chamber 20 at the outlet end 40. The outlet perimeter 90 is a scalar quantity. The outlet perimeter 90 can be from about 6 mm to about 60 mm, optionally from about 8 mm to about 30 mm, optionally from about 10 mm to about 20 mm. The smaller the outlet perimeter 90 the more constricted the flow of liquid product will be after it exits the outlet end 40.

The apparatus can comprise a vent 100. The vent 100 can comprise an entrance 110 exterior to the outlet end 40 and a vent wall 120 extending from the entrance 110 to an exit 130. That is, the vent entrance 110 can be spaced apart from the outlet end 40. The vent entrance 110 can have an area of from about 5 mm² to about 50 mm², optionally from about 20 mm² to about 30 mm², optionally about 28 mm². The vent entrance 110 only needs to be large enough to permit a sufficient quantity of air to flow back into the container 70 as liquid product is emptied from the container 70 so that the air pressure within the container 70 is equalized with the ambient air pressure.

The exit 130 can be in fluid communication with the pour chamber 20. The vent 100 provides for pathway for air from the external environment to enter the container 70 to replace the liquid product dispensed from the container 70. The vent 100 can be separated from the outlet end 40 so that flow of liquid product from the outlet end 40 does not interfere with or has minimal interference with venting of the container 70. To provide for steady flow of liquid product from the outlet end 40 and steady flow of air back into the bottle 70 the liquid product flow from the outlet end 40 can be independent of the air entry into the entrance 110 of the vent 100.

The exit 130 can be more distant from the dam 80 than the outlet end 40 is from the dam 80. This may help reduce the impact of air passing through the vent 100 and out the exit 130 from interfering will flow of liquid product past the dam 80. This in turn can help provide for a sufficiently steady flow rate of liquid product past the dam 80 and out the outlet end 40. Separating the flow past the dam 80 from bubbles entering the container through the vent 100 reduces the impact of air entering the container 70 on flow rate of liquid product out of the container 70.

The exit 130 can be more than about 0.5 times the outlet perimeter 90 away from the dam 80. This may also help separate venting of air back into the container 70 from liquid product being discharged from the outlet end 40. The spatial relationship of exit 130 and the dam 80 is taken to be the minimum straight line distance between the dam 80 and the interior wall of the exit 130. The exit 130 can be more than about 1.5 time more distant from the dam 80 than the outlet end 40 is from the dam 80. This may be helpful by providing enough distance between the dam 80 and the exit 130 so that air being vented back into the container 70 has little or no effect on the flow of liquid product being dispensed from the container past the dam 80. The exit 130 can have an exit perimeter 140. The exit perimeter 140 is the interior perimeter of the vent wall 120 at the exit 130. The outlet perimeter 90 can be more than about 2 times greater than the exit perimeter 140. The exit perimeter 140 can be from about 0.1 mm to about 12 mm. The exit perimeter 140 can be from about 1 mm to about 12 mm. The exit perimeter 140 can be from about 2 mm to about 4 mm. The exit perimeter 140 can be about 3.8 mm. A smaller exit perimeter 140 can be practical for reducing the potential for a double pour, which is a situation in which liquid product is discharged from the outlet end 40 and the entrance 110 of the vent. The capillary force of the liquid product can resist entry into the exit 130. The outlet perimeter 90 can be from about 1 mm to about 60 mm, optionally from about 1 mm to about 20 mm, optionally from about 2 mm to about 10 mm.

The ratio between the outlet perimeter 90 and the exit perimeter 140 can be from about 2:1 to about 20:1. Having the outlet perimeter 90 much larger than the exit perimeter 140 can reduce the potential for the liquid product to pour out of both the outlet end 40 and the entrance 110 of the vent 100. The smaller the exit perimeter 140, the less likelihood of liquid product entering the vent since capillary forces in the liquid product will resist entry of the liquid product into the exit 130 of the vent. The ratio between the outlet perimeter 90 and the exit perimeter 140 can be from about 3:1 to about 15:1, optionally about 3:1 to about 5:1, or optionally about 10:1. The greater the kinematic viscosity of the liquid product, the larger the ratio between the outlet perimeter 90 and exit perimeter 140 can be. The exit 130 can have an area from about 1 $mm^2$ to about 30 $mm^2$, optionally about 2 $mm^2$ to about 20 $mm^2$, optionally from about 3 $mm^2$ to about 10 $mm^2$, optionally about 7 $mm^2$. The exit 130 can have a diameter of from about 0.5 mm to about 5 mm, optionally about 1 mm to about 3 mm.

The apparatus 10 can further comprise a density timer 150 engaged with the pour chamber 20. A density timer 150 is a timer that operates on the principle of a contrast between the density of a timing element 400 positioned in a timing liquid 405 and movement of the timing element 400 through the timing liquid 405 driven by either the force of gravity or the buoyant force of the timing element 400 in the timing liquid 405. The principle of operation of a density timer 400 can be the amount of time that it takes for a timing element 400 that is denser than the timing liquid 405 to fall under the force of gravity a given distance through the timing liquid 405. In another option, the principle of operation of a density timer 400 can be the amount of time that it takes for a timing element 400 that is less dense than the timing liquid 405 to rise under the buoyant force a given distance through the timing liquid 405. Stokes law or other analytical or computational approach can be used to model movement of the timing element 400 through the timing liquid 405 to size and dimension the components of the density timer 150 appropriately. Similarly, Stokes law or other analytical or computational approach can be used to select the timing liquid 405 in view of the shape and or density and or properties of the timing element 400.

The density timer 150 can comprise a reservoir 410 containing a timing liquid 405 having a first density and timing element 400 having a second density. The second density can differ from the first density. The contrast in density between the timing liquid 405 and timing element 400 provides for either the tendency of the timing element 400 to sink in the timing liquid 405 or float in the timing liquid 405.

The timing element 400 can be moveable through the timing liquid 405. Movement of the timing element 400 can be driven, by way of nonlimiting example, by the buoyant force or gravitational force on the timing element 400.

The timing element 400 is in the reservoir 410. The timing element 400 is visible from outside the reservoir 410. This provides for the user of the dosing apparatus 10 to be able to see movement of the timing element 400 within the reservoir as liquid product is dispensed from the outlet end 40 of the pour chamber 20.

One or more dosing indicia 240 can be positioned on or adjacent the reservoir 410. The dosing indicia can be printed lines. The indicia can be raised marks, for instance lines, dot, arrows, and the like, or depressions, for instance etch marks, divots, arrows, and the like, on or in the reservoir 410. There can be a single dosing indicia 240 if the desired volume or mass of dose has a single value or is a multiple of such dose. There can be a plurality of dosing indicia 240 if there is more than one desired volume or mass of dose depending on the use of the liquid product. For instance, the dosing indicia 240 can be S, M, L, representative of small, medium, and large doses, respectively, or numbered, for example, as 1, 2, and 3.

The timing liquid 405 can be water. The timing liquid 405 can be provided with an antimicrobial substance to reduce or prevent biological growth in the timing liquid. The timing liquid 405 can be a liquid that has inherent antimicrobial properties. The timing liquid 405 can be ethanol, methanol, and mixtures thereof. The timing liquid 405 can be an oil such as sunflower oil, corn oil, olive oil, motor oil, or the like. The timing liquid 405 need only to have a viscosity low enough so that the timing element 400 can move through the timing liquid 405 under the applied force from gravity or buoyancy.

The timing element 400 can be a sphere. The timing element 400 can have a density greater than the density of the timing liquid 405. In such an arrangement, when the apparatus 10 is in the first position, in which liquid product is not being dispensed, the timing element 400 will be resting at the first end 415 of the reservoir 410. When the apparatus 10 is transitioned from the first position to the second position, the second position being the position of the apparatus 10 when liquid product is dispensed from the apparatus 10, the timing element 400 can fall through the timing liquid 405 passing and or approaching one or more dosing indicia 240. The timing element 400 can move through the timing liquid 405 from the first end 415 towards or to the second end 420 and towards or past the dosing indicia 240. As the user of the apparatus 10 observes the position of the timing element 400 relative to the dosing indicia 240 as the timing element 400 falls through the timing liquid 405, the user can decide to cease dispensing of the liquid product by tipping the apparatus 10 upright when the timing element 400 is at or past a selected dosing indicia 240.

As described herein, the reservoir 410 can have a first end 415, a second end 420 opposing the first end 415, and a reservoir wall 425 connecting the first end 415 to the second end 420. The reservoir wall 425 defines an interior chamber 430 containing the timing liquid 405. The reservoir 410 from the first end 415 to the second end 420 is aligned with the pour chamber 20 from the inlet end 30 to the outlet end 40.

The timing element 400 can also move when driven by a buoyant force. In such an arrangement, the timing element 400 can have a density less than the timing liquid 405. When the apparatus 10 is in the first position, the timing element 400 will be resting at the second end 420 of the reservoir 410. When the apparatus 10 is transitioned from the first position to the second position, the timing element 400 can rise through the timing liquid 405 passing and or approaching one or more dosing indicia 240. The timing element 400 can move through the timing liquid 405 from the second end 420 towards or to the first end 415 and towards or past the dosing indicia 240. The user can decide to cease dispensing of the liquid product by up righting the apparatus 10 when the timing element is at or past a selected dosing indicia 240.

The density of the timing element 400 is the mass of the timing element 400 divided by the volume of timing liquid 405 displaced. The timing element 400 can be a solid. For instance, the timing element 400 can be a nonporous solid plastic, ceramic, wax, or metal, or other material having a specific gravity or density greater than the specific gravity or density of the timing liquid 405 for an embodiment in which the timing element 400 moves under the force of gravity when the apparatus 10 is in the second position. Optionally, the timing element 400 can be a porous solid plastic, ceramic, or metal, or other material having sufficient mass per volume of timing liquid 405 displaced greater than the density of the timing liquid 405.

The timing element 400 can be a porous solid plastic, ceramic, wax, or metal, or other material having a density less than the density of the timing liquid 405 for an embodiment in which the timing element 400 moves under the buoyant force acting on the timing element 400 when the apparatus 10 is in the second position. The timing element 400 can be hollow. The timing element 400 can be a solid material having a specific gravity or density less than the specific gravity or density of the timing liquid 405. For instance, the timing element 400 can be a solid plastic ball.

The timing element 400 can be a liquid. The timing element 400 can be an oil or other liquid material having a density greater than the density of the timing liquid 405, for instance if the timing element 400 is meant to move under the force of gravity from the first end 415 towards the second end 420 when the apparatus 10 is in the second position. The timing element 400 can be an oil or other liquid material having a density less than the density of the timing liquid 405, for instance if the timing element 400 is meant to move under the buoyant force acting on the timing element 400 when the apparatus 10 is in the second position. A variety of oils and other liquid materials are available in different densities and the desired contrast in density of the timing element 400 and the timing liquid 405 can provided for. Such materials can desirably be ones that tend to remain in a clump.

Desirably, the timing element 400 can be visible from outside the reservoir 410. The user of the apparatus 10 can see the timing element 400 move to or past the one or more dosing indicia 240 as liquid product is dispensed from the apparatus 10. To provide for enhanced visibility of the timing element 400, there can be a contrast in color between the timing element 400 and the timing liquid 405. For instance, the timing liquid 405 can be from about 98% to about 100% by weight water. The timing element 400 can be a red solid plastic ball having a density greater than 1 g/cm$^3$.

The reservoir wall 425 can be fabricated from a clear plastic material. For instance, the reservoir wall 425 can be formed of acrylic, polypropylene, polyethylene, polyethylene terephthalate, and like materials.

Providing a timer 150 as described herein can be practical since the timer 150 is hydraulically isolated from the exit 130. Said otherwise, the timer 150 can be free of fluid communication between the timer 150 and exit 130. The timer 150 can be engaged with the pour chamber 20. The timer 150 can be engaged with the pour chamber 20 by being mounted on an exterior face 160 of the pour chamber 20. The timer 150 can be engaged with the pour chamber 20 by being joined to the container 70. The timer 150 can be joined to the pour chamber 20 by being joined to an element that connects the timer 150 and the pour chamber 20.

The timing liquid 405 can have a fixed volume. The fixed volume of timing liquid can be from about 0.5 cm$^3$ to about 4 cm$^3$, optionally from about 0.5 cm$^3$ to about 2 cm$^3$.

The timing liquid 405 is not in fluid communication with the pour chamber 20. Or, stated otherwise, the timing liquid 405 can be fluidly decoupled from the pour chamber 20. This enables functional separation of the timing aspect and the liquid product dispensing from the container 70. Since liquid product flow from a container 70 is dynamically complex, attempting to use a timer that is in liquid communication with contents of the container 70 is complicated by the complex liquid product flow regime from the container 70. Further, venting of air back into the container 70 may complicate measurement of volume of liquid product dispensed. The apparatus 10 can be considered to have a first position in which the outlet end 40 is above the inlet end 30 and a second position in which the inlet end 30 is above the outlet end 40. If the timing element 400 is buoyant within the timing liquid 405, the timing element 400 will be at or near the second end 420 of the reservoir 410 when the apparatus 10 is in the first position. If the timing element 400 has a density greater than the timing liquid 405, the timing element 400 will be at or near the first end 415 of the reservoir 410 when the apparatus 10 is in the first position. The first position of the apparatus 10 is in an upright position in which the apparatus 10 is mounted to a container 70 that this resting on its base so that the apparatus 10 is above the container 70.

The second position of the apparatus 10 is in a tipped position so that the outlet end 40 is below the inlet end 30. In this position, liquid product can be dispensed from the outlet end 40. The second position corresponds to the position of the apparatus 10 when a consumer tips or inverts a container 70 to dispense liquid product from the container 70.

In the first position the outlet end 40 can be above the inlet end 30. In the second position, the inlet end 30 can be above the outlet end 40. The contrast in density of the timing liquid 405 and the timing element 400 can be chosen so that the timing element 400 moves through the timing liquid 405 at a rate that can be observed and tracked by the consumer pouring liquid product from the container 70. The rate of movement needs to be high enough, and set in regard to the size of the outlet end 40 so that the duration of pouring is not too long so as not to become uncomfortable to the consumer or too short to reduce the potential for an inaccurate dose of liquid product. The duration of pour can be from about 2 s to about 10 s, optionally from about 4 s to about 7 s.

The reservoir 410 or a portion of the apparatus adjacent the reservoir 410 can comprise at least one dosing indicia 240. The dosing indicia 240 can be, by way of nonlimiting example, a raised portion of the exterior surface of the reservoir wall 425, a printed mark on the exterior surface of the reservoir wall 425, a pigmented or dyed portion of the reservoir wall 425, or a printed marked on the interior surface or exterior surface of the reservoir wall 425. The dosing indicia 240 can be indicative of a volume of liquid product dispensed out the outlet end 40 that corresponds to a recommended dose of liquid product. Multiple dosing indicia 240 can be provided as part of the reservoir 410 or a portion of the apparatus adjacent the reservoir 410.

The apparatus can further comprise a container 70 having an open end 250. The pour chamber 20, dam 80, vent 100, and density timer 150 can be engaged with the open end 250. For instance, together the pour chamber 20, dam 80, vent 100, and density timer 150 can together form a fitment that fits onto and or into the open end 250 of the container 70.

An outlet closure 260 can be engaged with the outlet end 40 of the pour chamber 20. Optionally, the outlet closure 260 can be engaged with the pour chamber 20 to close both the outlet end 40 and the vent 100. The outlet closure 260 helps to prevent spillage liquid product from the container 70 in the event that the container is unintentionally inverted. The apparatus 10 can be connected to a container 70 as a fitment, snapped to, or threaded to the container 70. The open end 250 of the container 70 can have threads on the interior of the open end 250 or the exterior. The apparatus 10 can be screwed onto the container 70. The interior of the apparatus 10 can have threads engageable with external threads on the container 70.

The apparatus 10 can be provided with a drain-back feature. A drain-back feature can be practical for catching drips from the outlet end 40 when the consumer is finished dispensing from the container 70. The outlet end 40 can be a spout 45. The spout 45 can be a portion of the pour chamber 20 upstream of the outlet end 40. The spout 45 can have a spout inlet 47 upstream of the outlet end 40. The drain-back feature can comprise a floor 270 extending at least partially around the spout 45 and outwardly away from the spout 45. The drain-back feature can further comprise a channel wall 280 extending from the floor 270 in a direction away from the inlet end 30 to define a channel 290 between the spout 45 and the channel wall 280. The floor 270 can be sloped to the entrance 105 or to a hole in fluid communication with the pour chamber 20. The floor 270 can be sloped at an angle from horizontal of from about 5 degrees to about 45 degrees. The channel 290 can be described as being exterior to the pour chamber 20 or spout 45. The channel 290 can be further described as being beneath the spout 45. The channel 290 can further be described as positioned between the outlet end 40 and the inlet end 30. The apparatus 10 can further be considered to comprise a floor 270 extending at least partially around the pour chamber wall 50 and outwardly away from the pour chamber wall 50 and a channel wall 280 extending from the floor in direction away from the inlet end 40 to define a channel 290 between the pour chamber wall 50 and the channel wall 280.

The drain-back feature can also serve as the vent 100. Optionally, the drain-back feature can be separate from the vent 100.

The apparatus 10 further comprise a container 70 having an open end 250. The pour chamber 20, dam 80, vent 100, density timer 150, outlet closure 260 together can form at least part of a container closure 262.

The vent 100 can be independent from the drain-back feature. For instance the drain-back feature can be provided as a hole in the floor 270 of the channel 290 and a separate vent 100, structured as described above, can be provided at another location on the apparatus 10. For instance, the drain-back feature can comprise a hole connected to a drain-back tube 300.

The density timer 150 can be mounted on the container 70. For example, the timer 150 can be mounted on a handle of the container 70. Optionally, the timer 150 can be mounted on the container 70 at a position between the handle and open end 250 of the container 70.

The apparatus 10 can be used in a process for dispensing a liquid product. As liquid product is dispensed through the outlet end 40. As liquid product is dispensed through the outlet end 20, the timing element 400 can move through the timing liquid 405. The consumer can observe movement of the timing element 400 through the timing liquid 405 and the position of the timing element 400 relative to the dosing indicia 240 and once the location of the timing element 400 corresponds with or coincides with a dosing indicia 240, the consumer can turn the apparatus 10 upright to stop dispensing of the liquid product.

The apparatus 10 can be manufactured by additive manufacturing, such as three-dimensional printing. This can be practical for geometries such as a curved spout 45, by way of nonlimiting example. The apparatus can be formed by injection molding. The apparatus 10 can comprise polypropylene, polyethylene, or other polymeric material.

Figure 2:
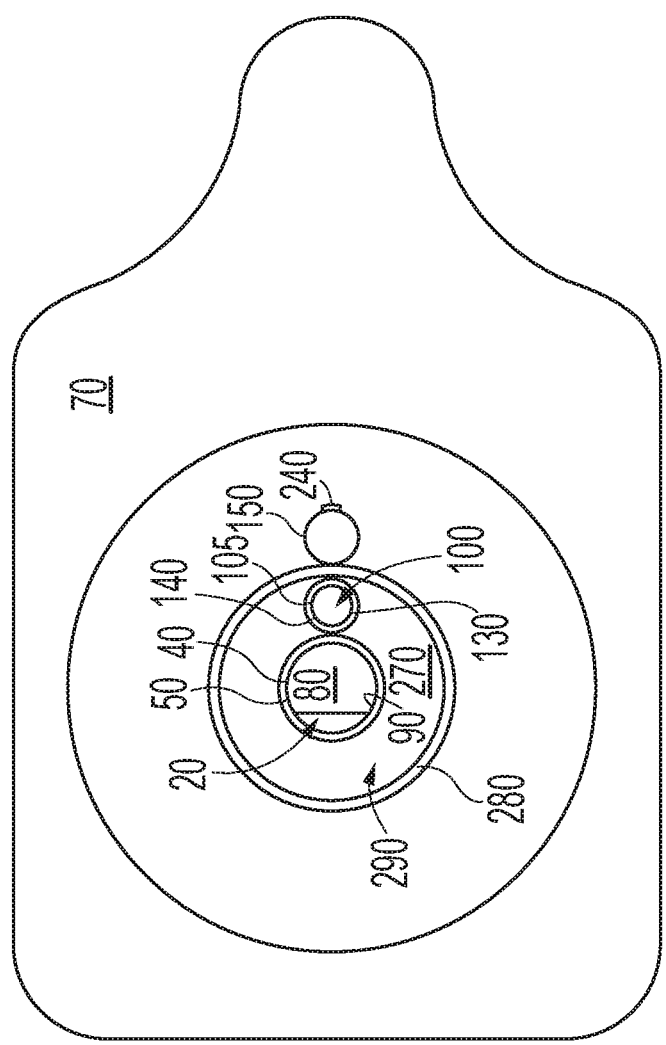
FIG. 2 is a top view of an apparatus.

FIG. 2 is a top view of an apparatus.

Figure 3:
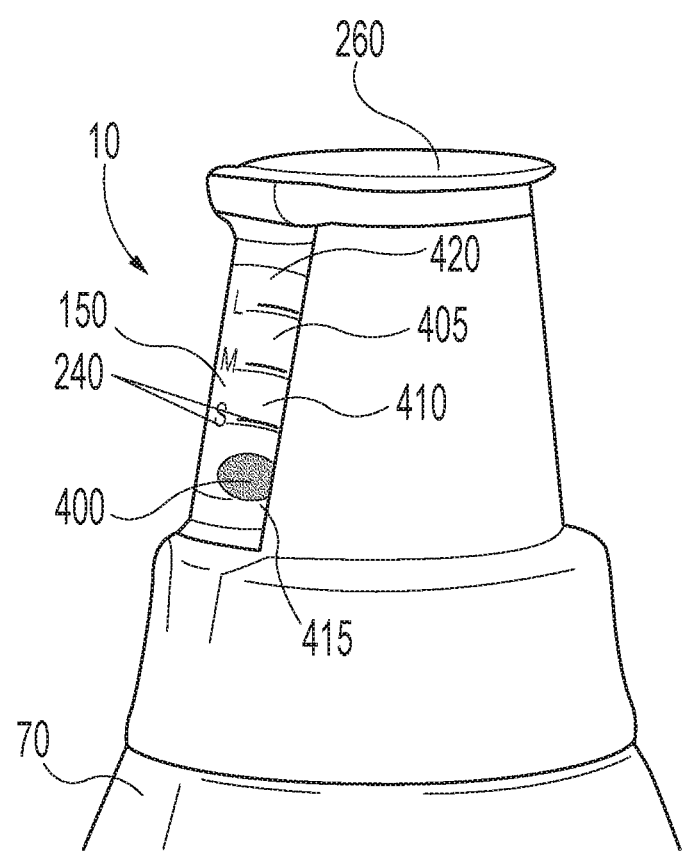
FIG. 3 is an image of an apparatus.

FIG. 3 is an image of an apparatus 10. FIG. 3 illustrates the apparatus 10 in the first position. The timing element 400 is resting at the first end 415 of the reservoir 410. In the embodiment shown in FIG. 3, the timing element 400 has a density greater than the timing liquid 405. Hence the timing element 400 is at the bottom of the timing liquid 405.

Figure 4:
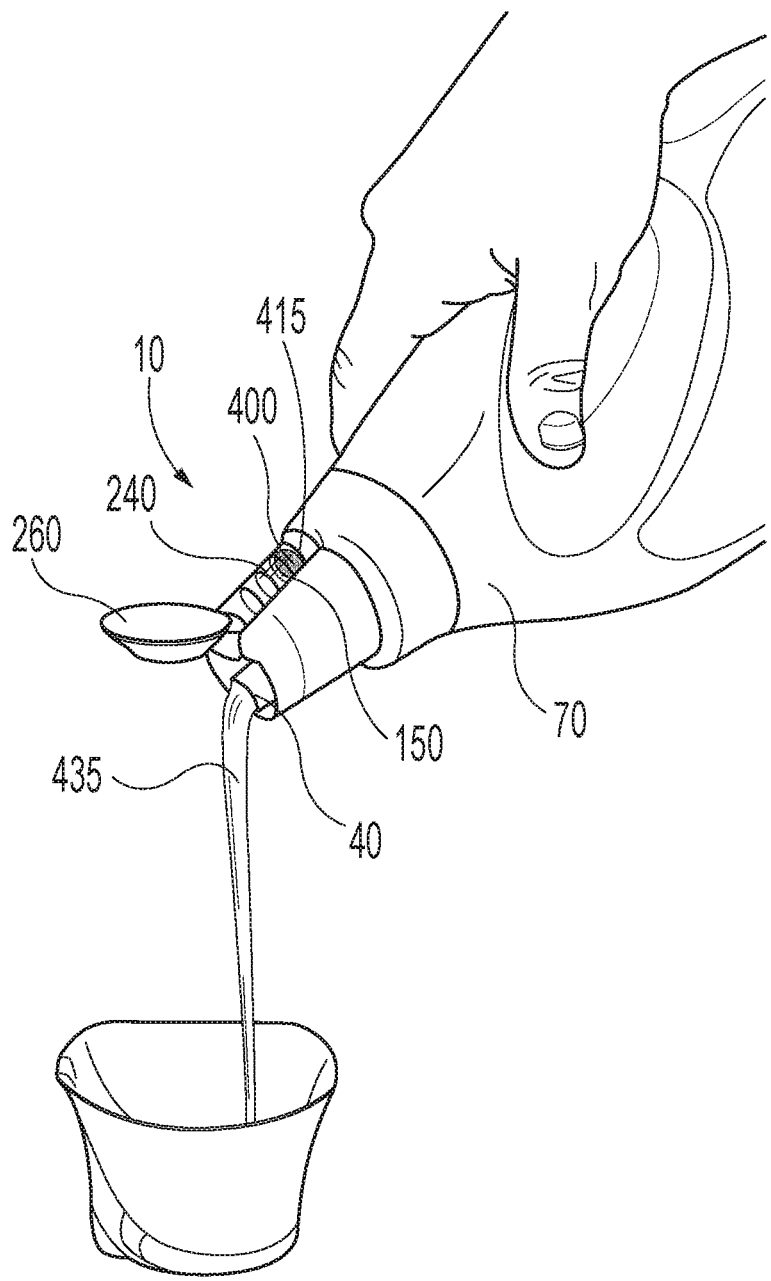
FIG. 4 is an image of the apparatus in the second position shortly after the dispensing of liquid product commences. The timing element is nearer to the first end of the reservoir than to the second end of the reservoir.

FIG. 4 is an image of the apparatus in the second position shortly after the dispensing of liquid product 435 commences. The timing element 400 is nearer to the first end 415 of the reservoir 410 than to the second end 420 of the reservoir 410.

Figure 5:
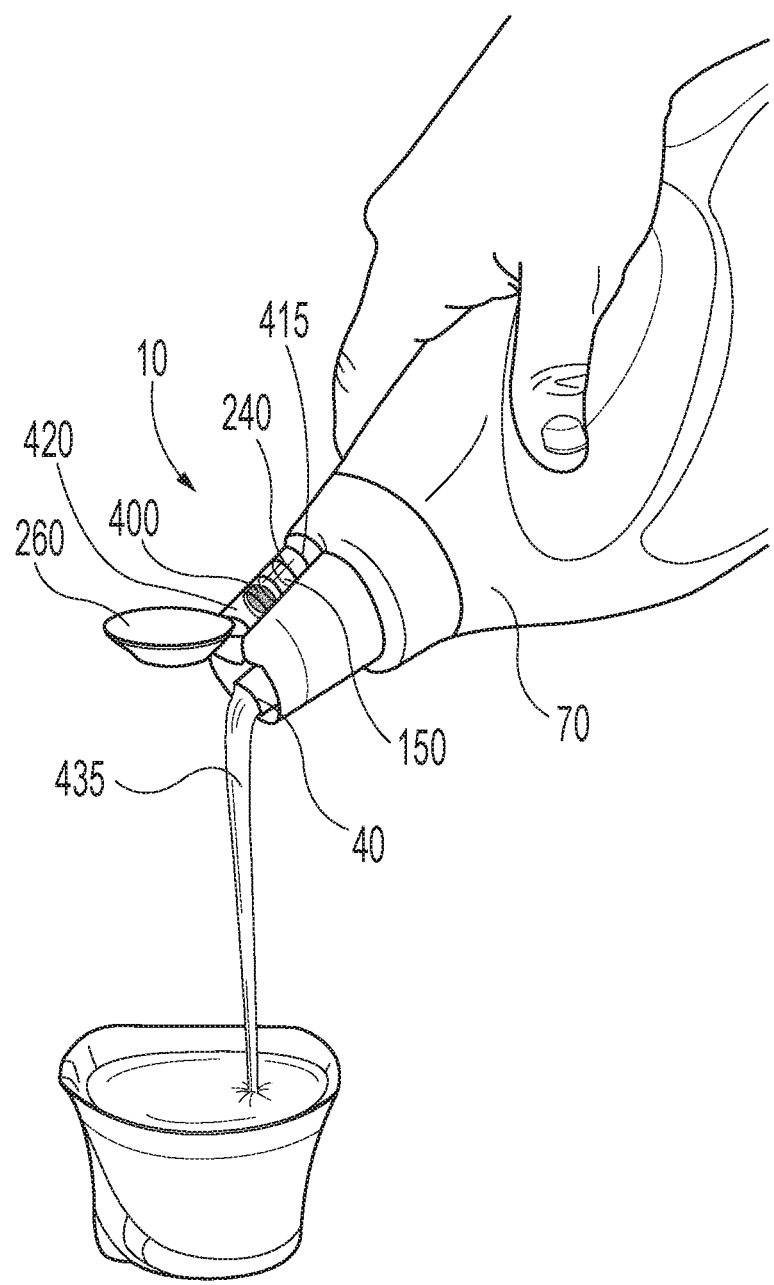
FIG. 5 is an image of the apparatus in the second position after the apparatus has been in such position long enough for a quantity of liquid product to have been dispensed. The timing element has moved past dosing indicia and towards the dosing indicia nearest to the second end of the reservoir and is nearer to the second end of the reservoir than to first end of the reservoir.

FIG. 5 is an image of the apparatus in the second position after the apparatus 10 has been in such position long enough for a quantity of liquid product 435 to have been dispensed. The quantity of liquid product 435 is commensurate with the quantity of liquid product 435 associated with the dosing indicia 240 that is nearest the second end 420 of the reservoir 410. The timing element has moved past two dosing indicia 240 and towards the dosing indicia 240 nearest to the second end 420 of the reservoir 410 and is nearer to the second end 420 of the reservoir 410 than to first end 415 of the reservoir 410.

Figure 6:
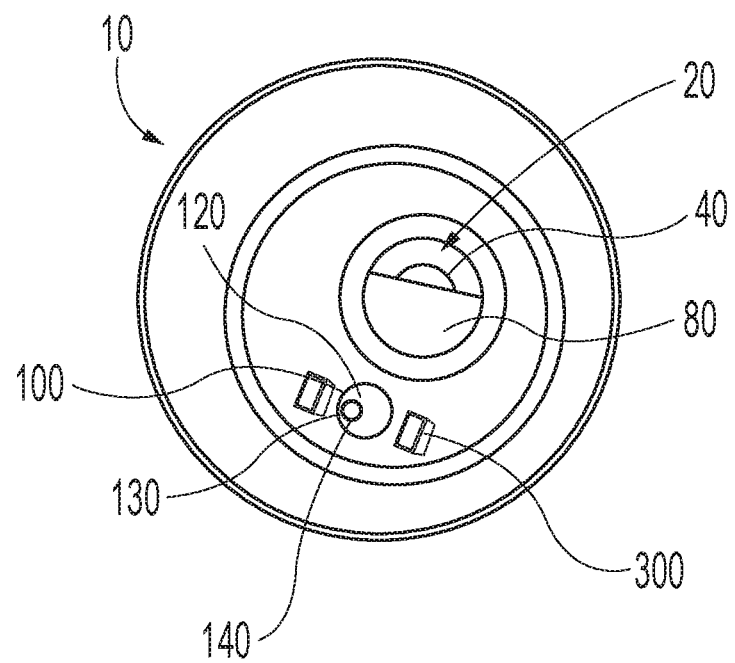
FIG. 6 is a bottom view image of an apparatus.
Figure 7:
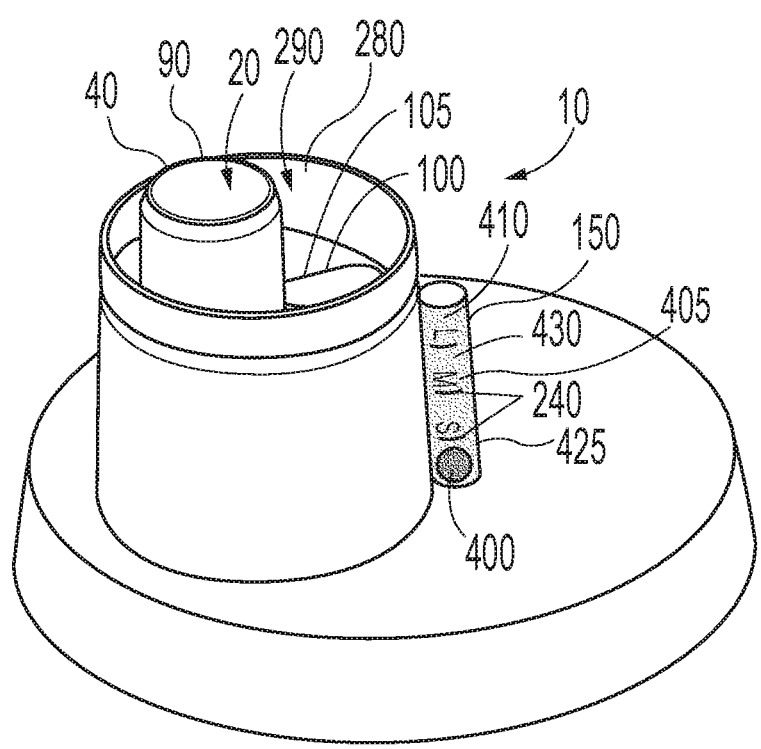
FIG. 7 is a perspective view of an apparatus.
Figure 8:
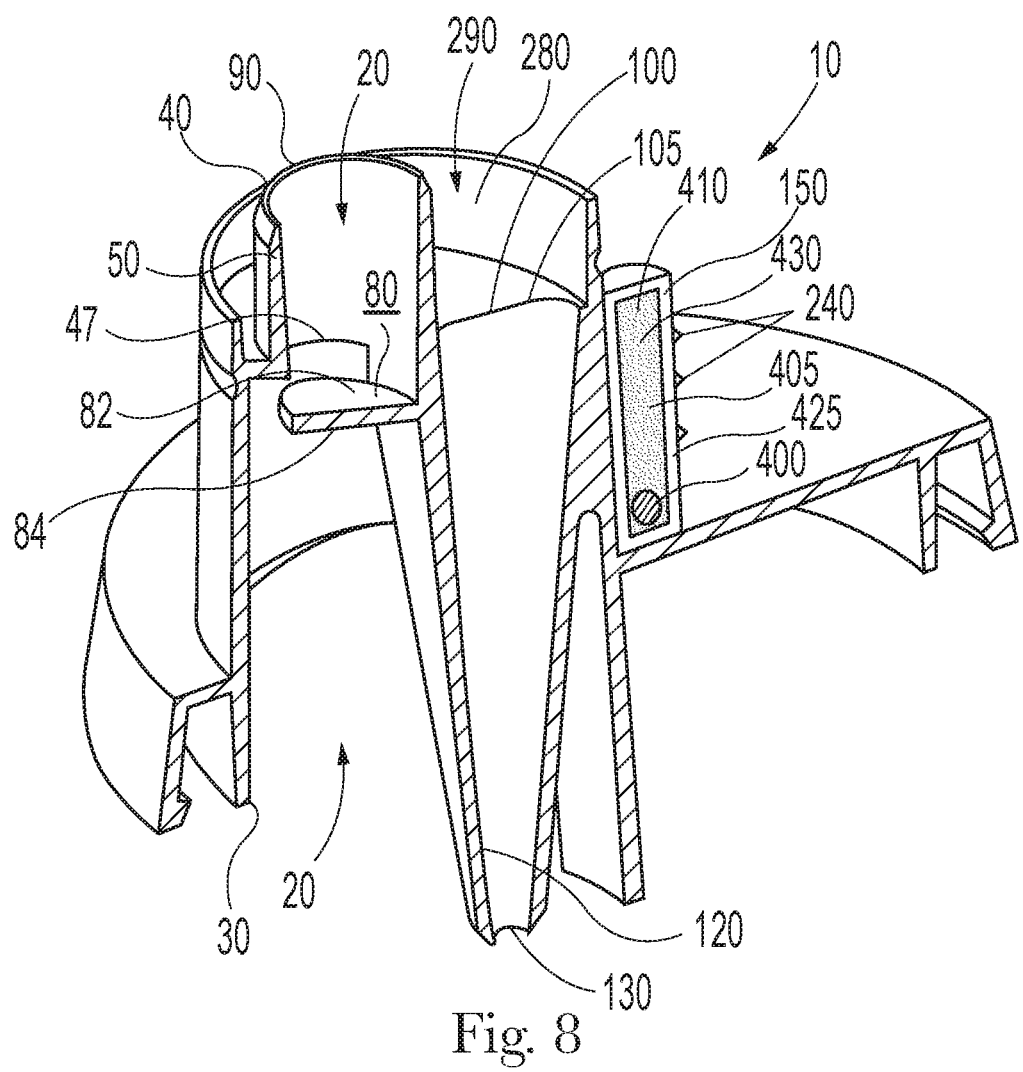
FIG. 8 is cutaway view of an apparatus.

FIG. 6 is a bottom view image of an apparatus 10.
FIG. 7 is a perspective view of an apparatus 10.
FIG. 8 is cutaway view of an apparatus 10.

EXAMPLES AND COMBINATIONS

A. An apparatus (10) comprising:
   a pour chamber (20) comprising an inlet end (30) and an outlet end (40) and a pour chamber wall (50) extending from said inlet end to said outlet end, wherein said pour chamber has an open cross sectional area (60) through which flow can occur from said inlet end to said outlet end; and
   a density timer (150) engaged with said pour chamber, said density timer comprising:
      a reservoir (410) containing a timing liquid (405) having a first density and a timing element (400) having a second density, wherein said second density differs from said first density, said timing element (400) is movable through said timing liquid, and said timing element is visible from outside said reservoir; and one or more dosing indicia (240) on or adjacent to said reservoir.
B. The apparatus according to Paragraph A, wherein said open cross sectional area is a function of position between said inlet end and said outlet end, said outlet end being downstream of said inlet end, wherein said outlet end has an outlet perimeter, and wherein a portion of said pour chamber upstream of said outlet end is a spout having a spout entrance upstream of said outlet end;
   wherein said apparatus further comprises a dam (80) engaged with said pour chamber wall and positioned between said inlet end and said spout, wherein said open cross sectional area is reduced where said dam is positioned as compared to a position immediately upstream of said dam, and wherein said dam partially obstructs said spout entrance.
C. The apparatus according to Paragraph B, further comprising a vent (100) comprising an entrance (105) spaced apart from said outlet end and a vent wall extending from said entrance to an exit (130), wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter (140) and said outlet perimeter (90) is more than about 2 times greater than said exit perimeter.
D. The apparatus according to Paragraph C, further comprising a container (70) having an open end (250), wherein said pour chamber, said dam, said vent, and said density timer are engaged with said open end.
E. The apparatus according to Paragraph C, further comprising a container (70) having an open end (250), wherein said pour chamber, said dam, said vent, said density timer, and said outlet closure together form at least part of a container closure (262).
F. The apparatus according to any of Paragraphs C to E, wherein said exit is more than about 1.5 times more distant from said dam than said outlet end is from said dam.
G. The apparatus according to any of Paragraphs A to C, wherein said density timer is mounted on a container (70).
H. The apparatus according to any of Paragraphs A to G, wherein said reservoir comprises a first end (415), a second end (420) opposing said first end, and a reservoir wall (425) connecting said first end to said second end, said reservoir wall defining an interior chamber (430) containing said timing liquid, wherein said reservoir from said first end to said second end is aligned with said pour chamber from said inlet end to said outlet end.
I. The apparatus according to any of Paragraphs A to H, wherein said second density is greater than said first density.
J. The apparatus according to any of Paragraph A to I, wherein said second density is less than said first density.
K. The apparatus according to any of Paragraphs A to J wherein said timing element is a solid.
L. The apparatus according to any of Paragraphs A to J, wherein said timing element is a liquid.
M. The apparatus according to any of Paragraphs A to L, wherein said apparatus has a first position in which said outlet end is above said inlet end and a second position in which said inlet end is above said outlet end, wherein when said apparatus is in said second position said timing element is visible from outside said reservoir.
N. The apparatus according to any of Paragraphs A to M, wherein an outlet closure (260) is engaged with said outlet end 40.
O. The apparatus according to any of Paragraphs A to N, wherein said apparatus further comprises a floor (270) extending at least partially around said spout and outwardly away from said spout and a channel wall (280) extending from said floor in a direction away from said inlet end (30) to define a channel (290) between said spout and said channel wall, wherein said floor is sloped to said entrance or to a hole in fluid communication with said pour chamber.
P. The apparatus according to any of Paragraphs A to N, wherein said apparatus further comprises a floor extending at least partially around said spout and outwardly away from said spout and a channel wall extending from said floor in a direction away from said inlet end to define a channel between said spout and said channel wall, wherein said floor is sloped to a hole in fluid communication with said pour chamber and said vent is separate from said hole.
Q. The apparatus according to any of Paragraphs A to P, wherein said apparatus has a first position in which said outlet end is above said inlet end and a second position in which said inlet end is above said outlet end, wherein said reservoir comprises a first end (415), a second end (420) opposing said first end, and a reservoir wall (425) connecting said first end to said second end, said reservoir wall (425) defining an interior chamber (430) containing said timing liquid, wherein when said apparatus is transitioned from said first position to said second position said timing element moves through said timing liquid from said first end towards said second end or moves through said timing liquid from said second end towards said first end.
R. A process for dispensing a liquid product (435) with the apparatus according to any of Paragraphs A to Q, wherein as said liquid product is dispensed through said outlet end said timing element moves through said timing liquid towards or past said dosing indicia.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus (10) comprising:
   a pour chamber (20) comprising an inlet end (30) and an outlet end (40) and a pour chamber wall (50) extending from said inlet end to said outlet end, wherein said pour chamber has an open cross sectional area (60) through which flow can occur from said inlet end to said outlet end,
   wherein said open cross sectional area is a function of position between said inlet end and said outlet end, said outlet end being downstream of said inlet end, wherein said outlet end has an outlet perimeter, and wherein a portion of said pour chamber upstream of said outlet end is a spout (45) having a spout entrance upstream of said outlet end;
   a dam (80) engaged with said pour chamber wall and positioned between said inlet end and said spout, wherein said open cross sectional area is reduced where said dam is positioned as compared to a position immediately upstream of said dam, and wherein said dam partially obstructs said spout entrance;
   a vent (100) comprising an entrance (105) spaced apart from said outlet end and a vent wall extending from said entrance to an exit (130), wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter (140) and said outlet perimeter (90) is more than about 2 times greater than said exit perimeter; and
   a density timer (150) engaged with said pour chamber, said density timer comprising:
      a reservoir (410) containing a timing liquid (405) having a first density and a timing element (400) having a second density, wherein said second density differs from said first density, said timing element (400) is movable through said timing liquid, and said timing element is visible from outside said reservoir; and
      one or more dosing indicia (240) on or adjacent to said reservoir.

2. The apparatus according to claim 1, wherein said reservoir comprises a first end (415), a second end (420) opposing said first end, and a reservoir wall (425) connecting said first end to said second end, said reservoir wall defining an interior chamber (430) containing said timing liquid, wherein said reservoir from said first end to said second end is aligned with said pour chamber from said inlet end to said outlet end.

3. The apparatus according to claim 1, wherein said second density is greater than said first density.

4. The apparatus according to claim 1, wherein said second density is less than said first density.

5. The apparatus according to claim 1, wherein said timing element is a solid.

6. The apparatus according to claim 1, wherein said timing element is a liquid.

7. The apparatus according to claim 1, wherein said apparatus has a first position in which said outlet end is above said inlet end and a second position in which said inlet end is above said outlet end, wherein when said apparatus is in said second position said timing element is visible from outside said reservoir.

8. The apparatus according to claim 1, further comprising a container (70) having an open end (250), wherein said pour chamber, said dam, said vent, and said density timer are engaged with said open end.

9. The apparatus according to claim 1, wherein an outlet closure (260) is engaged with said outlet end 40.

10. The apparatus according to claim 1, wherein said apparatus further comprises a floor (270) extending at least partially around said spout and outwardly away from said spout and a channel wall (280) extending from said floor in a direction away from said inlet end (30) to define a channel (290) between said spout and said channel wall, wherein said floor is sloped to said entrance or to a hole in fluid communication with said pour chamber.

11. The apparatus according to claim 1, further comprising a container (70) having an open end (250), wherein said pour chamber, said dam, said vent, said density timer, and said outlet closure together form at least part of a container closure (262).

12. The apparatus according to claim 1, wherein said exit is more than about 1.5 times more distant from said dam than said outlet end is from said dam.

13. The apparatus according to claim 1, wherein said apparatus further comprises a floor extending at least partially around said spout and outwardly away from said spout and a channel wall extending from said floor in a direction away from said inlet end to define a channel between said spout and said channel wall, wherein said floor is sloped to a hole in fluid communication with said pour chamber and said vent is separate from said hole.

14. The apparatus according to claim 1, wherein said density timer is mounted on a container (70).

15. The apparatus according to claim 1, wherein said apparatus has a first position in which said outlet end is above said inlet end and a second position in which said inlet end is above said outlet end, wherein said reservoir comprises a first end (415), a second end (420) opposing said first end, and a reservoir wall (425) connecting said first end to said second end, said reservoir wall (425) defining an interior chamber (430) containing said timing liquid, wherein when said apparatus is transitioned from said first position to said second position said timing element moves through said timing liquid from said first end towards said second end or moves through said timing liquid from said second end towards said first end.

16. A process for dispensing a liquid product (435) with the apparatus according to claim 1, wherein as said liquid product is dispensed through said outlet end said timing element moves through said timing liquid towards or past said dosing indicia.

17. An apparatus (10) comprising:
   a pour chamber (20) comprising an inlet end (30) and an outlet end (40) and a pour chamber wall (50) extending from said inlet end to said outlet end, wherein said pour chamber has an open cross sectional area (60) through which flow can occur from said inlet end to said outlet end; and a density timer (150) engaged with said pour chamber, said density timer comprising:

a reservoir (410) containing a timing liquid (405) having a first density and a timing element (400) having a second density, wherein said second density differs from said first density, said timing element (400) is movable through said timing liquid, and said timing element is visible from outside said reservoir; and one or more dosing indicia (240) on or adjacent to said reservoir;

wherein said open cross sectional area is a function of position between said inlet end and said outlet end, said outlet end being downstream of said inlet end, wherein said outlet end has an outlet perimeter, and wherein a portion of said pour chamber upstream of said outlet end is a spout having a spout entrance upstream of said outlet end; and wherein said apparatus further comprises a vent (100) comprising an entrance (105) spaced apart from said outlet end and a vent wall extending from said entrance to an exit (130), wherein said exit is in fluid communication with said pour chamber, wherein said exit has an exit perimeter (140) and said outlet perimeter (90) is more than about 2 times greater than said exit perimeter.

18. The apparatus according to claim 17, wherein said apparatus has a first position in which said outlet end is above said inlet end and a second position in which said inlet end is above said outlet end, wherein said reservoir comprises a first end (415), a second end (420) opposing said first end, and a reservoir wall (425) connecting said first end to said second end, said reservoir wall (425) defining an interior chamber (430) containing said timing liquid, wherein when said apparatus is transitioned from said first position to said second position said timing element moves through said timing liquid from said first end towards said second end or moves through said timing liquid from said second end towards said first end.

19. A process for dispensing a liquid product (435) with the apparatus according to claim 17, wherein as said liquid product is dispensed through said outlet end said timing element moves through said timing liquid towards or past said dosing indicia.

\* \* \* \* \*